(12) United States Patent
Shu et al.

(10) Patent No.: US 11,967,180 B1
(45) Date of Patent: Apr. 23, 2024

(54) DYNAMIC FACIAL EXPRESSION RECOGNITION (FER) METHOD BASED ON DEMPSTER-SHAFER (DS) THEORY

(71) Applicants: Qilu University of Technology (Shandong Academy of Sciences), Jinan (CN); SHANDONG COMPUTER SCIENCE CENTER (NATIONAL SUPERCOMPUTING CENTER IN JINAN), Jinan (CN)

(72) Inventors: Minglei Shu, Jinan (CN); Zhenyu Liu, Jinan (CN); Zhaoyang Liu, Jinan (CN); Shuwang Zhou, Jinan (CN); Pengyao Xu, Jinan (CN)

(73) Assignees: QILU UNIVERSITY OF TECHNOLOGY (SHANDONG ACADEMY OF SCIENCES), Jinan (CN); SHANDONG COMPUTER SCIENCE CENTER (NATIONAL SUPERCOMPUTING CENTER IN JINAN), Jinan (CN)

( * ) Notice: Subject to any disclaimer, the term of this patent is extended or adjusted under 35 U.S.C. 154(b) by 0 days.

(21) Appl. No.: 18/381,195

(22) Filed: Oct. 18, 2023

(30) Foreign Application Priority Data

Dec. 8, 2022 (CN) .......................... 202211576932.1

(51) Int. Cl.
*G06V 40/16* (2022.01)
*G06T 5/20* (2006.01)
(Continued)

(52) U.S. Cl.
CPC .............. *G06V 40/176* (2022.01); *G06T 5/20* (2013.01); *G06V 10/44* (2022.01); *G06V 10/764* (2022.01); *G06V 10/814* (2022.01); *G06V 40/161* (2022.01)

(58) Field of Classification Search
CPC .... G06V 40/176; G06V 10/44; G06V 10/764; G06V 10/814; G06V 40/161; G06T 5/20
See application file for complete search history.

(56) References Cited

U.S. PATENT DOCUMENTS

2022/0161815 A1* 5/2022 Van Beek .............. G06N 20/00

OTHER PUBLICATIONS

Q. Xu, B. Sun, J. He, B. Rong, L. Yu and P. Rao, "Multimodal Facial Expression Recognition Based on Dempster-Shafer Theory Fusion Strategy," 2018 First Asian Conference on Affective Computing and Intelligent Interaction (ACII Asia), Beijing, China, 2018, pp. 1-5, doi: 10.1109/ACIIAsia.2018.8470353. (Year: 2018).*

(Continued)

*Primary Examiner* — Phuoc Tran
(74) *Attorney, Agent, or Firm* — Bayramoglu Law Offices LLC (57) ABSTRACT

A dynamic facial expression recognition (FER) method based on a Dempster-Shafer (DS) theory improves a feature extraction effect of an expression video through multi-feature fusion, and deeply learns an imbalanced dynamic expression feature by using the DS theory, multi-branch convolution, and an attention mechanism. Compared with other methods, the dynamic FER method scientifically and effectively reduces an impact of sample imbalance on expression recognition, fully utilizes a spatio-temporal feature to mine potential semantic information of the video expression to perform expression classification, thereby improving reliability and accuracy and meeting a demand for the expression recognition.

8 Claims, 4 Drawing Sheets

(51) Int. Cl.
*G06V 10/44* (2022.01)
*G06V 10/764* (2022.01)
*G06V 10/80* (2022.01)

(56) References Cited

OTHER PUBLICATIONS

Y. Liu, L. Chen, M. Li, M. Wu, W. Pedrycz and K. Hirota, "Deep Residual Network with D—S Evidence Theory for Bimodal Emotion Recognition," 2021 China Automation Congress (CAC), Beijing, China, 2021, pp. 4674-4679, doi: 10.1109/CAC53003.2021. 9727443. (Year: 2021).*

* cited by examiner

DYNAMIC FACIAL EXPRESSION RECOGNITION (FER) METHOD BASED ON DEMPSTER-SHAFER (DS) THEORY

CROSS REFERENCE TO THE RELATED APPLICATIONS

This application is based upon and claims priority to Chinese Patent Application No. 202211576932.1, filed on Dec. 9, 2022, the entire contents of which are incorporated herein by reference.

TECHNICAL FIELD

The present disclosure relates to the technical field of facial expression classification methods, and specifically, to a dynamic facial expression recognition (FER) method based on a Dempster-Shafer (DS) theory.

BACKGROUND

Facial expression recognition (FER) is an important research topic in a wide range of research fields, from artificial intelligence (AI) to psychology. With the improvement of social automation, FER is increasingly applied to the fields of safety, medical treatment, criminal investigation, and education. The traditional method performs expression classification based on a handmade feature. However, the handmade feature is only an artificially designed feature with a weak expressive force and is unable to accurately express semantic information. As a result, the traditional method has poor performance in an FER task. In recent years, with the vigorous development of deep learning, various deep learning-based FER methods have been proposed. However, a deep learning method has difficulty achieving the same enhanced effect on an expression dataset. This is because humans express expressions at different frequencies in real scenes, resulting in varying difficulty in collecting different expressions. The distribution of the quantity of expressions in each category in RAF-DB and FER2013 datasets is extremely uneven, which is referred to as sample imbalance. This phenomenon will lead to insufficient feature learning for a minority of classes and reduce recognition accuracy.

SUMMARY

In order to overcome the shortcomings of the above technologies, the present disclosure provides a dynamic FER method based on a DS theory, which uses a classifier guided by the DS theory and a feature extraction module including an attention mechanism and a multi-layer perceptron to improve accuracy of expression recognition.

The technical solution used in the present disclosure to resolve the technical problem thereof is as follows:

A dynamic FER method based on a DS theory includes the following steps:
a) preprocessing video data V in a dataset, extracting last N frames of the video data V to obtain consecutive video frames, and performing face detection, alignment, and clipping operations on the video frames to obtain a facial expression image P;
b) constructing a Dempster-Shafer theory Expression Recognition (DSER) network model, where the DSER network model includes a same-identity inter-frame sharing module $M_s$, a space-domain attention module $M_{att}$, a time-domain fully connected (FC) unit $V_{FC}$, a time-domain multi-layer perceptron unit $V_{MLP}$, a spatio-temporal feature fusion module $M_{st}$, and a discriminator $D_{ds}$ guided by a DS theory;
c) separately inputting the facial expression image P into the same-identity inter-frame sharing module $M_s$ and the space-domain attention module $M_{att}$ in the DSER network model, to obtain a same-identity inter-frame shared feature $F_s^P$ and a space-domain attention feature $F_{att}^P$, and multiplying the same-identity inter-frame shared feature $F_s^P$ by the space-domain attention feature $F_{att}^P$ to obtain a space-domain feature $F_{satt}^{PS}$;
d) sequentially inputting the facial expression image P into the time-domain FC unit $V_{FC}$ and the time-domain multi-layer perceptron unit $V_{MLP}$ in the DSER network model to obtain a time-domain vector $V_{FCMLP}^{PT}$;
e) inputting the space-domain feature $F_{satt}^{PS}$ and the time-domain vector $V_{FCMLP}^{PT}$ into the spatio-temporal feature fusion module $M_{st}$ in the DSER network model to obtain a spatio-temporal feature $F_{st}^P$;
f) inputting the spatio-temporal feature $F_{st}^P$ into the discriminator $D_{ds}$ guided by the DS theory in the DSER network model, to obtain a classification result R, and completing the construction of the DSER network model;
g) calculating a loss function l;
h) iterating the DSER network model by using the loss function l and an Adam optimizer, to obtain a trained DSER network model; and
i) processing to-be-detected video data by using the step a), to obtain a facial expression image, and inputting the facial expression image into the trained DSER network model to obtain the classification result R.

Further, in the step a), last 16 frames of the video data V are extracted based on a VideoCapture class in Python to obtain consecutive video frames, face detection is performed on the consecutive video frames by using a Deformable Parts Model (DPM) algorithm, a face image of each of the consecutive video frames is extracted to obtain a continuous 16-frame face image, and face alignment and clipping are performed on the continuous 16-frame face image by using a practical expression landmark detector (PELD) algorithm, to obtain an aligned continuous 16-frame facial expression image P.

Further, the step c) includes the following steps:
c-1) constituting the same-identity inter-frame sharing module $M_s$ by a first convolution module, a second convolution module, and a third convolution module sequentially, and constituting the space-domain attention module $M_{att}$ by a first FC module and a second FC module sequentially;
c-2) constituting the first convolution module of the same-identity inter-frame sharing module $M_s$ by a convolutional layer with a 3*3 convolution kernel and a stride of 1, a batch normalization (BN) layer, and a ReLu activation function layer sequentially, and inputting the facial expression image P into the first convolution module to obtain a feature $F_{s1}^P$;
c-3) constituting the second convolution module of the same-identity inter-frame sharing module $M_s$ by a downsampling module and a residual module sequentially, where the downsampling module includes a first branch and a second branch, the first branch sequentially comprises a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer, the second branch sequentially includes a third convolutional layer with a 1*1 convolution kernel and a stride of 2, a third BN layer, and a third ReLu activation function layer, the residual module sequentially includes a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer; inputting the feature $F_{s1}^P$ into the first branch of the downsampling module of the second convolution module to obtain a feature $F_{sd2}^{P1}$, and inputting the feature $F_{s1}^P$ into the second branch of the downsampling module of the second convolution module to obtain a feature $F_{sd2}^{P2}$; adding up the feature $F_{sd2}^{P1}$ and the feature $F_{sd2}^{P2}$ to obtain a feature $F_{sd2}^P$; and inputting the feature $F_{sd2}^P$ into the residual module of the second convolution module to obtain a feature $F_{s2}^P$;

c-4) constituting the third convolution module of the same-identity inter-frame sharing module $M_s$ by a downsampling module and a residual module sequentially, where the downsampling module includes a first branch and a second branch, the first branch sequentially includes a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer, the second branch sequentially includes a third convolutional layer with a 1*1 convolution kernel and a stride of 2, a third BN layer, and a third ReLu activation function layer, the residual module sequentially comprises a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer; inputting the feature $F_{s2}^P$ into the first branch of the downsampling module of the third convolution module to obtain a feature $F_{sd3}^{P1}$, and inputting the feature $F_{s1}^P$ into the second branch of the downsampling module of the third convolution module to obtain a feature $F_{sd3}^{P2}$; adding up the feature $F_{sd3}^{P1}$ and the feature $F_{sd3}^{P2}$ to obtain a feature $F_{sd3}^P$; and inputting the feature $F_{sd3}^P$ into the residual module of the third convolution module to obtain a feature $F_{s3}^P$;

c-5) calculating the same-identity inter-frame shared feature $F_s^P$ according to a formula $$F_s^P = \frac{1}{16}\sum_{i=1}^{16} F_{s3}^{Pi},$$

where in the formula, $F_{s3}^{Pi}$ represents an $i^{th}$ video frame vector in the feature $F_{sd3}^P$;

c-6) constituting the first FC module of the space-domain attention module $M_{att}$ by a BN layer, a flatten function, an FC layer, and a ReLu activation function layer sequentially, and inputting the facial expression image P into the first FC module to obtain a feature $F_{att1}^P$;

c-7) constituting the second FC module of the space-domain attention module $M_{att}$ by an FC layer and a Sigmoid function layer sequentially, and inputting the feature $F_{att1}^P$ into the second FC module to obtain the space-domain attention feature $F_{att}^P$; and c-8) multiplying the same-identity inter-frame shared feature $F_s^P$ by the space-domain attention feature $F_{att}^P$ to obtain the space-domain feature $F_{satt}^{PS}$.

Further, the step d) includes the following steps:

d-1) constituting the time-domain FC unit $V_{FC}$ by a patch partitioning module, a flatten function, an FC layer, and a ReLU activation function layer sequentially, inputting the facial expression image P into the patch partitioning module for patch partitioning to obtain a patch partitioning vector $V_{patch}^P$, inputting the patch partitioning vector $V_{patch}^P$ into the flatten function to obtain a one-dimensional vector $V_{patch1}^P$, and sequentially inputting the one-dimensional vector $V_{patch1}^P$ into the FC layer and the ReLU activation function layer to obtain a time-domain FC vector $V_{FC}^P$; and d-2) constituting the time-domain multi-layer perceptron unit $V_{MLP}$ by a BN layer, an FC layer, and a ReLU activation function layer, and inputting the time-domain FC vector $V_{FC}^P$ into the time-domain multi-layer perceptron unit $V_{MLP}$ to obtain the time-domain vector $V_{FCMLP}^{PT}$.

Further, the step e) includes the following steps:

e-1) inputting the space-domain feature $F_{satt}^{PS}$ and the time-domain vector $V_{FCMLP}^{PT}$ into the spatio-temporal feature fusion module $M_{st}$ in the DSER network model, and calculating the spatio-temporal feature $F_{st}^P$ according to a formula $F_{st}^P = F_{satt}^{PS} + \lambda V_{FCMLP}^{PT}$, where $\lambda$ represents an adjustable hyper-parameter.

Preferably, $\lambda=0.54$.

Further, the step f) includes the following steps:

f-1) constituting, by a multi-branch convolution module, an uncertainty combination module, a multi-branch fusion module, and a determining module sequentially, the discriminator $D_{ds}$ guided by the DS theory;

f-2) constituting the multi-branch convolution module by a first branch, a second branch, and a third branch sequentially, where the first branch, the second branch, and the third branch each sequentially include a first convolutional layer with a 3*3 convolution kernel and a stride of 1, a first BN layer, a first ReLu activation function layer, a second convolutional layer with a 3*3 convolution kernel and a stride of 2, a second BN layer, a second ReLu activation function layer, an average pooling layer, a flatten function layer, and a linear layer sequentially; and inputting the spatio-temporal feature $F_{st}^P$ into the first branch, the second branch, and the third branch of the multi-branch convolution module to obtain a first branch vector $VP_{st1}^P$, a second branch vector $V_{st2}^P$, and a third branch vector $V_{st3}^P$ respectively;

f-3) inputting the first branch vector $V_{st1}^P$ the second branch vector $V_{st2}^P$, and the third branch vector $V_{st3}^P$ into the uncertainty combination module; taking an exponent with e as a base for the first branch vector $V_{st1}^P$ to obtain a first evidence vector $e_1=[e_1^1, e_1^2, e_1^k, \ldots, e_1^K]$, where $e_1^k$ represents an $i^{th}$ evidence vector in the first branch vector, and $k=\{1,2,\ldots,K\}$; taking the exponent with e as the base for the second branch vector $V_{st2}^P$ to obtain a second evidence vector $e_2=[e_2^1, e_2^2, \ldots, e_2^k, \ldots, e_2^K]$, where $e_2^k$ represents an $i^{th}$ evidence vector in the second branch vector; taking the exponent with e as the base for the third branch vector $V_{st3}^P$ to obtain a third evidence vector $e_3=[e_3^1, e_3^2, \ldots, e_3^k, \ldots, e_3^K]$, where $e_3^k$ represents an $i^{th}$ evidence vector in the third branch vector, $k=\{1,2,\ldots,K\}$, K represents a quantity of sample categories, K=7, and values of k one-to-one correspond to numbers in a label sequence [1: surprise, 2: fear, 3: disgust, 4: happiness, 5: sadness, 6: anger, 7: neutral]; calculating a $k^{th}$ Dirichlet parameter $\alpha_1^k$ of the first evidence vector $e_1$ according to a formula $\alpha_1^k=e_1^k+1$, calculating a $k^{th}$ Dirichlet parameter $\alpha_2^k$ of the second evidence vector $e_2$ according to a formula $\alpha_2^k=e_2^k+1$, and calculating a $k^{th}$ Dirichlet parameter $\alpha_3^k$ of the third evidence vector $e_3$ according to a formula $\alpha_3^k=e_3^k+1$; obtaining Dirichlet strength $S_1$ of the first evidence vector $e_1$ according to a formula $S_1=\Sigma_{k=1}^K \alpha_1^k$, Dirichlet strength $S_2$ of the second evidence vector $e_2$ according to a formula $S_2=\Sigma_{k=1}^K \alpha_2^k$, and Dirichlet strength $S_3$ of the third evidence vector $e_3$ according to a formula $S_3=\Sigma_{k=1}^K \alpha_3^k$; obtaining first uncertainty $\mu_1$ according to a formula $$u_1 = \frac{K}{S_1},$$

second uncertainty $\mu_2$ according to a formula $$u_2 = \frac{K}{S_2},$$

and third uncertainty $\mu_3$ according to a formula $$u_3 = \frac{K}{S_3};$$

obtaining a first confidence coefficient $b_1$ according to a formula $$b_1 = \frac{\alpha_1^k - 1}{S_1},$$

a second confidence coefficient $b_2$ according to a formula $$b_2 = \frac{\alpha_2^k - 1}{S_2},$$

and a third confidence coefficient $b_3$ according to a formula $$b_3 = \frac{\alpha_3^k - 1}{S_3};$$

calculating a first conflict factor $C_{12}$ according to a formula $C_{12}=b_1 b_2$ and a second conflict factor $C_{23}$ according to a formula $C_{23}=b_2 b_3$; calculating a second prefix weight $w_2$ according to a formula $$w_2 = \frac{1}{1-C_{12}} u_1 u_2,$$

and a third prefix weight $w_3$ according to a formula $$w_3 = \frac{1}{1-C_{23}} u_2 u_3,$$

where a first prefix weight is $w_1=1$; and multiplying the first branch vector $V_{st1}^P$ by the first prefix weight $w_1$ to obtain a first weight vector $V_1^P$, multiplying the second branch vector $V_{st2}^P$ by the second prefix weight $w_2$ to obtain a second weight vector $V_2^P$ and multiplying the third branch vector $V_{st3}^P$ by the third prefix weight $w_3$ to obtain a third weight vector $V_3^P$;

f-4) inputting the first weight vector $V_1^P$, the second weight vector $V_2^P$, and the third weight vector $V_3^P$ into the multi-branch fusion module, and calculating a fusion vector $V_{fuse}^P$ according to a formula $V_{fuse}^P=V_1^P+V_2^P+V_3^P$; and f-5) constituting the determining module by a Softmax function and a max function, inputting the fusion vector $V_{fuse}^P$ into the Softmax function for normalization, inputting a normalized fusion vector $V_{fuse}^P$ into the max function to obtain a subscript $E_k$ of a maximum value, where $k=\{1, 2, \ldots, K\}$, and the values of k one-to-one correspond to the numbers in the label sequence [1: surprise, 2: fear, 3: disgust, 4: happiness, 5: sadness, 6: anger, 7: neutral], and comparing the subscript $E_k$ of the maximum value with the label sequence [1: surprise, 2: fear, 3: disgust, 4: happiness, 5: sadness, 6: anger, 7: neutral] to find a corresponding expression label as a determining result R.

Further, in the step g), the loss function l is calculated according to a formula $l=\lambda l_{KL}(E_k)+l_{BCE}(V_{fuse}^P)$, where $\lambda$ represents an adjustment factor, $\lambda=0.04$, $l_{KL}(E_k)$ represents a calculation result of a KL loss of a subscript $E_k$, and $l_{BCE}(V_{fuse}^P)$ represents a calculation result of a BCE loss of a fusion vector $V_{fuse}^P$.

The present disclosure has following beneficial effects: A feature extraction effect of an expression video is improved through multi-feature fusion, and an imbalanced dynamic expression feature is deeply learned by using a DS theory, multi-branch convolution, and an attention mechanism. Compared with other methods, the dynamic FER method scientifically and effectively reduces an impact of sample imbalance on expression recognition, fully utilizes a spatio-temporal feature to mine potential semantic information of the video expression to perform expression classification, thereby improving reliability and accuracy and meeting a demand for the expression recognition.

DETAILED DESCRIPTION OF THE EMBODIMENTS

The present disclosure is further described with reference to FIG. 1 and FIG. 2.

Figure 1:
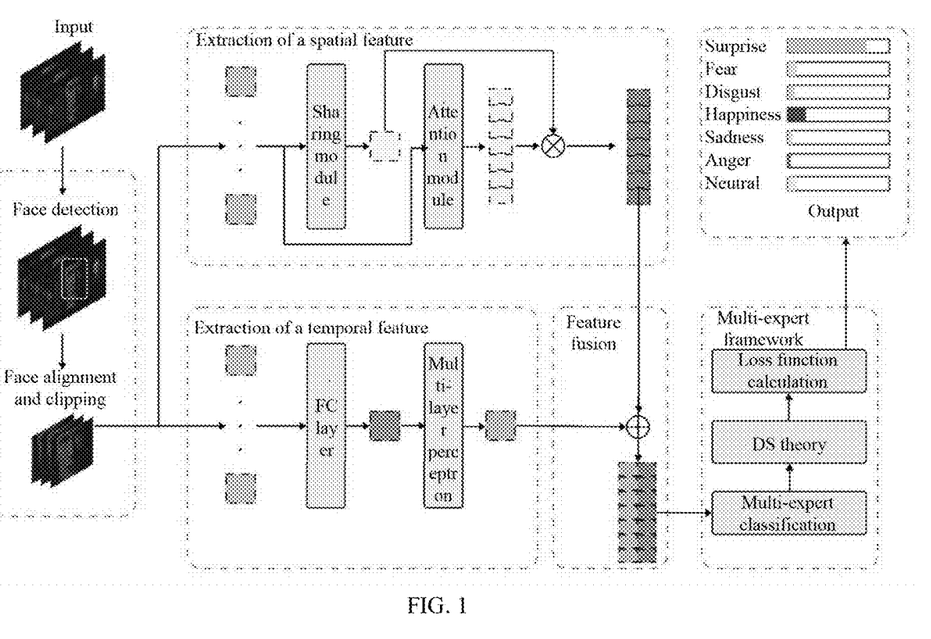
FIG. 1 is a flowchart of a method according to the present disclosure.

As shown in FIG. 1, a dynamic FER method based on a DS theory includes the following steps:
- a) Video data V in a dataset is preprocessed, last N frames of the video data V are extracted to obtain consecutive video frames, and face detection, alignment, and clipping operations are performed on the video frames to obtain facial expression image P.
- b) A DSER network model is constructed, where the DSER network model includes same-identity inter-frame sharing module $M_s$, space-domain attention module $M_{att}$, time-domain FC unit $V_{FC}$, time-domain multi-layer perceptron unit $V_{MLP}$, spatio-temporal feature fusion module $M_{st}$, and discriminator $D_{ds}$ guided by a DS theory.
- c) The facial expression image P is separately input into the same-identity inter-frame sharing module $M_s$ and the space-domain attention module $M_{att}$ in the DSER network model, to obtain same-identity inter-frame shared feature $F_s^P$ and space-domain attention feature $F_{att}^P$, and the same-identity inter-frame shared feature $F_s^P$ is multiplied by the space-domain attention feature $F_{att}^P$ to obtain space-domain feature $F_{satt}^{PS}$.
- d) The facial expression image P is sequentially inputting into the time-domain FC unit $V_{FC}$ and the time-domain multi-layer perceptron unit $V_{MLP}$ in the DSER network model to obtain time-domain vector $V_{FCMLP}^{PT}$]
- e) The space-domain feature $F_{satt}^{PS}$ and the time-domain vector $V_{FCMLP}^{PT}$ are input into the spatio-temporal feature fusion module $M_{st}$ in the DSER network model to obtain spatio-temporal feature $F_{st}^P$.
- f) The spatio-temporal feature $F_{st}^P$ is input into the discriminator $D_{ds}$ guided by the DS theory in the DSER network model, to obtain classification result R, and the construction of the DSER network model is completed.
- g) Loss function l is calculated.
- h) The DSER network model is iterated by using the loss function l and an Adam optimizer, to obtain a trained DSER network model.
- i) To-be-detected video data is processed by using the step a), to obtain a facial expression image, and the facial expression image is input into the trained DSER network model to obtain the classification result R.

An inter-frame sharing network is used to extract a shared spatial feature from consecutive video frames, and a sharing module is added to compensate for insufficient feature learning of a minority of classes. In addition, to reduce a computational cost, a simple FC layer is used to capture long-term time information, and core semantics of a time feature are gradually discovered by introducing a multi-layer perceptron. On this basis, a fusion module is used to fuse spatial and temporal features to form a spatio-temporal feature. Finally, evidence and uncertainty are calculated based on the DS theory, and are combined based on the DS theory to ensure efficiency while maintaining good performance. The present disclosure improves a feature extraction effect of an expression video through multi-feature fusion, and deeply learns an imbalanced dynamic expression feature by using the DS theory, multi-branch convolution, and an attention mechanism. Compared with other methods, the dynamic FER method scientifically and effectively reduces an impact of sample imbalance on expression recognition, fully utilizes a spatio-temporal feature to mine potential semantic information of the video expression to perform expression classification, thereby improving reliability and accuracy and meeting a demand for the expression recognition.

Embodiment 1

In the step a), last 16 frames of the video data V are extracted based on a VideoCapture class in Python to obtain consecutive video frames, face detection is performed on the consecutive video frames by using a DPM algorithm, a face image of each of the consecutive video frames is extracted to obtain a continuous 16-frame face image, and face alignment and clipping are performed on the continuous 16-frame face image by using a PELD algorithm, to obtain an aligned continuous 16-frame facial expression image P.

Embodiment 2

The step c) includes the following steps:
- c-1) The same-identity inter-frame sharing module $M_s$ is constituted by a first convolution module, a second convolution module, and a third convolution module sequentially, and the space-domain attention module $M_{att}$ is constituted by a first FC module and a second FC module sequentially.
- c-2) The first convolution module of the same-identity inter-frame sharing module $M_s$ is constituted by a convolutional layer with a 3*3 convolution kernel and a stride of 1, a BN layer, and a ReLu activation function layer sequentially, and the facial expression image P is input into the first convolution module to obtain feature $F_{s1}^P$.
- c-3) The second convolution module of the same-identity inter-frame sharing module $M_s$ is constituted by a downsampling module and a residual module sequentially. The downsampling module includes a first branch and a second branch. The first branch sequentially includes a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer. The second branch sequentially includes a third convolutional layer with a 1*1 convolution kernel and a stride of 2, a third BN layer, and a third ReLu activation function layer. The residual module sequentially includes a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer. The feature $F_{s1}^P$ is input into the first branch of the downsampling module of the second convolution module to obtain feature $F_{sd2}^{P1}$ and the feature $F_{s1}^P$ is input into the second branch of the downsampling module of the second convolution module to obtain feature $F_{sd2}^{P2}$. The feature $F_{sd2}^{P1}$ and the feature $F_{sd2}^{P2}$ are added up to obtain feature $F_{sd2}^P$. The feature $F_{sd2}^{P2}$ is input into the residual module of the second convolution module to obtain feature $F_{s2}^P$.
- c-4) The third convolution module of the same-identity inter-frame sharing module $M_s$ is constituted by a downsampling module and a residual module sequentially. The downsampling module includes a first branch and a second branch. The first branch sequentially includes a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer. The second branch sequentially includes a third convolutional layer with a 1*1 convolution kernel and a stride of 2, a third BN layer, and a third ReLu activation function layer. The residual module sequentially includes a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer. The feature $F_{s2}^P$ is input into the first branch of the downsampling module of the third convolution module to obtain feature $F_{sd3}^{P1}$, and the feature $F_{s1}^P$ is input into the second branch of the downsampling module of the third convolution module to obtain feature $F_{sd3}^{P2}$. The feature $F_{sd3}^{P1}$ and the feature $F_{sd3}^{P2}$ are added up to obtain feature $F_{sd3}^P$. The feature $F_{sd3}^P$ is input into the residual module of the third convolution module to obtain feature $F_{s3}^P$.

c-5) The same-identity inter-frame shared feature $F_s^P$ is calculated according to formula $$F_s^P = \frac{1}{16}\sum_{i=1}^{16} F_{s3}^{Pi},$$

where in the formula, $F_{s3}^{Pi}$ represents an $i^{th}$ video frame vector in the feature $F_{sd3}^P$.

c-6) The first FC module of the space-domain attention module $M_{att}$ is constituted by a BN layer, a flatten function, an FC layer, and a ReLu activation function layer sequentially, and the facial expression image P is input into the first FC module to obtain feature $F_{att1}^P$.

c-7) The second FC module of the space-domain attention module $M_{att}$ is constituted by an FC layer and a Sigmoid function layer sequentially, and the feature $F_{att1}^P$ is input into the second FC module to obtain the space-domain attention feature $F_{att}^P$.

c-8) The same-identity inter-frame shared feature $F_s^P$ is multiplied by the space-domain attention feature $F_{att}^P$ to obtain the space-domain feature $F_{satt}^{PS}$.

Embodiment 3

The step d) includes the following steps:
d-1) The time-domain FC unit $V_{FC}$ is constituted by a patch partitioning module, a flatten function, an FC layer, and a ReLU activation function layer sequentially, the facial expression image P is input into the patch partitioning module to be divided into two groups (there are 24 channels in each group) along a channel dimension, patch partitioning is performed to obtain patch partitioning vector $V_{patch}^P$, the patch partitioning vector $V_{patch}^P$ is input into the flatten function to obtain one-dimensional vector $V_{patch1}^P$ and the one-dimensional vector $V_{patch1}$ is sequentially input into the FC layer and the ReLU activation function layer to obtain time-domain FC vector $V_{FC}^P$.
d-2) The time-domain multi-layer perceptron unit $V_{MLP}$ is constituted by a BN layer, an FC layer, and a ReLU activation function layer, and the time-domain FC vector $V_{FC}^P$ is input into the time-domain multi-layer perceptron unit $V_{MLP}$ to obtain the time-domain vector $V_{FCMLP}^{PT}$.

Embodiment 4

The step e) includes the following steps:
e-1) The space-domain feature and the time-domain vector $V_{FCMLP}^{PT}$ are input into the spatio-temporal feature fusion module $M_{st}$ in the DSER network model, and the spatio-temporal feature $F_{st}^P$ is calculated according to formula $F_{st}^P = F_{satt}^{PS} + \lambda V_{FCMLP}^{PT}$. In the formula, $\lambda$ represents an adjustable hyper-parameter.

Embodiment 5

$\lambda = 0.54$.

Embodiment 6

Figure 2:
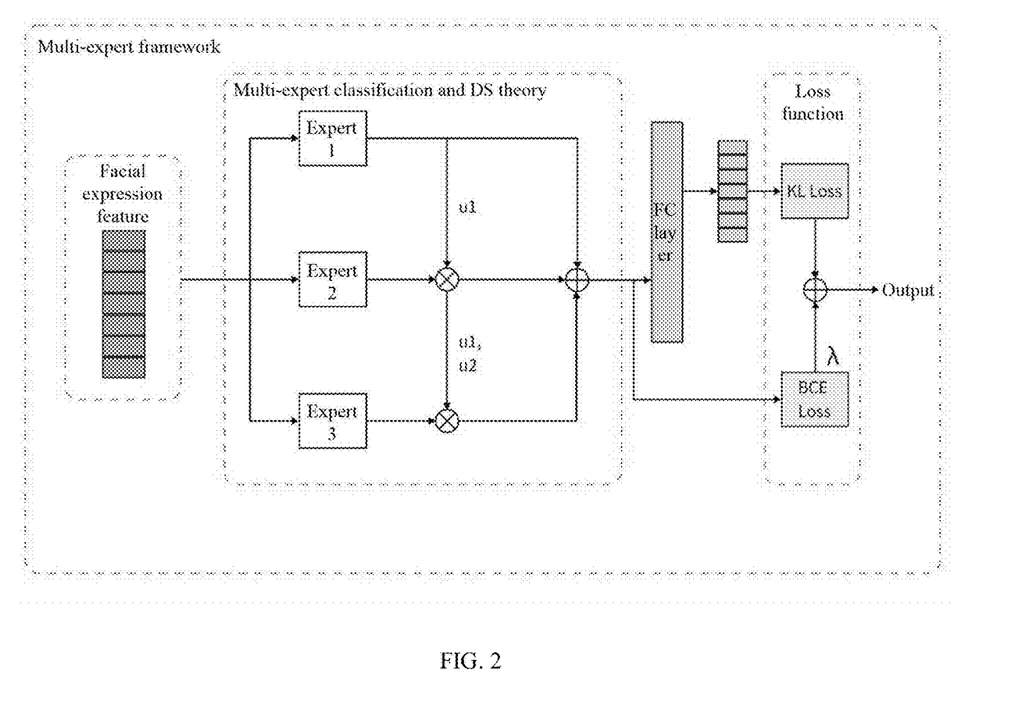
FIG. 2 is a structural diagram of a discriminator guided by a DS theory according to the present disclosure.

The step f) includes the following steps:
f-1) As shown in FIG. 2, the discriminator $D_{ds}$ guided by the DS theory is constituted by a multi-branch convolution module, an uncertainty combination module, a multi-branch fusion module, and a determining module sequentially.
f-2) The multi-branch convolution module is constituted by a first branch, a second branch, and a third branch sequentially. The first branch, the second branch, and the third branch each sequentially include a first convolutional layer with a 3*3 convolution kernel and a stride of 1, a first BN layer, a first ReLu activation function layer, a second convolutional layer with a 3*3 convolution kernel and a stride of 2, a second BN layer, a second ReLu activation function layer, an average pooling layer, a flatten function layer, and a linear layer sequentially. The spatio-temporal feature $F_{st}^P$ is input into the first branch, the second branch, and the third branch of the multi-branch convolution module to obtain first branch vector $V_{st1}^P$, second branch vector $V_{st2}^P$, and third branch vector $V_{st3}^P$ respectively.
f-3) The first branch vector $V_{st1}^P$ the second branch vector $V_{st2}^P$ and the third branch vector $V_{st3}^P$ are input into the uncertainty combination module. An exponent with e as a base is taken for the first branch vector $V_{st1}^P$ to obtain first evidence vector $e_1 = [e_1^1, e_1^2, \ldots, e_1^k, \ldots, e_1^K]$, where $e_1^k$ represents an $i^{th}$ evidence vector in the first branch vector, and $k = \{1, 2, \ldots, K\}$. The exponent with e as the base is taken for the second branch vector $V_{st2}^P$ to obtain second evidence vector $e_2 = [e_2^1, e_2^2, \ldots, e_2^k, \ldots, e_2^K]$, where $e_2^k$ represents an $i^{th}$ evidence vector in the second branch vector. The exponent with e as the base is taken for the third branch vector $V_{st3}^P$ to obtain third evidence vector $e_3 = [e_3^1, e_3^2, \ldots, e_3^k, \ldots, e_3^K]$, where $e_3^k$ represents an $i^{th}$ evidence vector in the third branch vector, $k = \{1, 2, \ldots, K\}$, represents a quantity of sample categories, K=7, and values of k one-to-one correspond to numbers in a label sequence [1: surprise, 2: fear, 3: disgust, 4: happiness, 5: sadness, 6: anger, 7: neutral], in other words, k=1 represents the surprise, k=2 represents the fear, k=3 represents the disgust, k=4 represents the happiness, k=5 represents the sadness, k=6 represents the anger, and k=7 represents the neutral. $k^{th}$ Dirichlet parameter $\alpha_1^k$ of the first evidence vector $e_1$ is calculated according to formula $\alpha_1^k = e_1^k 1$, $k^{th}$ Dirichlet parameter $\alpha_2^k$ of the second evidence vector $e_2$ is calculated according to formula $\alpha_2^k = e_2^k 1$, and $k^{th}$ Dirichlet parameter $\alpha_3^k$ of the third evidence vector $e_3$ is calculated according to formula $\alpha_3^k = e_3^k 1$. Dirichlet strength $S^1$ of the first evidence vector $e_1$ is obtained according to formula $S_1=\Sigma_{k=1}^{K}\alpha_1^k$, a Dirichlet strength $S_2$ of the second evidence vector $e_2$ is obtained according to formula $S_2=\Sigma_{k=1}^{K}\alpha_2^k$, and Dirichlet strength $S_3$ of the third evidence vector $e_3$ is obtained according to formula $S_3=\Sigma_{k=1}^{K}\alpha_3^k$. First uncertainty $u_1$ is obtained according to formula $$u_1 = \frac{K}{S_1},$$

second uncertainty $u_2$ is obtained according to formula $$u_2 = \frac{K}{S_2},$$

and third uncertainty $u_3$ is obtained according to formula $$u_3 = \frac{K}{S_3}.$$

First confidence coefficient $b_1$ is obtained according to formula $$b_1 = \frac{\alpha_1^k - 1}{S_1},$$

second confidence coefficient $b_2$ is obtained according to formula $$b_2 = \frac{\alpha_2^k - 1}{S_2},$$

and third confidence coefficient $b_3$ is obtained according to formula $$b_3 = \frac{\alpha_3^k - 1}{S_3}.$$

First conflict factor $C_{12}$ is calculated according to formula $C_{12}=b_1b_2$ and second conflict factor $C_{23}$ is obtained according to formula $C_{23}=b_2b_3$. Second prefix weight $w_2$ is obtained according to formula $$w_2 = \frac{1}{1-C_{12}} u_1 u_2,$$

and third prefix weight $w_3$ is obtained according to formula $$w_3 = \frac{1}{1-C_{23}} u_2 u_3,$$

where a first prefix weight is $w_1=1$. The first branch vector $V_{st1}^P$ is multiplied by the first prefix weight $w_1$ to obtain first weight vector $V_1^P$, the second branch vector $V_{st2}^P$ is multiplied by the second prefix weight $w_2$ to obtain second weight vector $V_2^P$, and the third branch vector $V_{st3}^P$ is multiplied by the third prefix weight $w_3$ to obtain third weight vector $V_3^P$.

f-4) The first weight vector $V_1^P$, the second weight vector $V_2^P$, and the third weight vector $V_3^P$ are input into the multi-branch fusion module, and fusion vector $V_{fuse}^P$ is calculated according to formula $V_{fuse}^P=V_1^P+V_2^P+V_3^P$.

f-5) The determining module is constituted by a Softmax function and a max function. The fusion vector $V_{fuse}^P$ is input into the Softmax function for normalization, and normalized fusion vector $V_{fuse}^P$ is input into the max function to obtain subscript $E_k$ of a maximum value, where k={1, 2, ... , K}, and the values of k one-to-one correspond to the numbers in the label sequence [1: surprise, 2: fear, 3: disgust, 4: happiness, 5: sadness, 6: anger, 7: neutral]. The subscript $E_k$ of the maximum value is compared with the label sequence [1: surprise, 2: fear, 3: disgust, 4: happiness, 5: sadness, 6: anger, 7: neutral] to find a corresponding expression label as determining result R .

Embodiment 7

In the step g), the loss function l is calculated according to formula $l=\lambda l_{KL}(E_k)+l_{BCE}(V_{fuse}^P)$ where $\lambda$ represents an adjustment factor, $\lambda=0.04$, $l_{KL}(E_k)$ represents a calculation result of a KL loss of subscript $E_k$, and $l_{BCE}(V_{fuse}^P)$ represents a calculation result of a BCE loss of fusion vector $V_{fuse}^P$.

Taking data in public dataset DFEW as an example, the following specifically describes implementations of the present disclosure.

A face image and a facial expression label corresponding to the face image are obtained from the dataset DFEW, and a DSER network model is constructed. The DSER network model includes same-identity inter-frame sharing module $M_s$, space-domain attention module $M_{att}$, time-domain FC unit $V_{FC}$, time-domain multi-layer perceptron unit $V_{MLP}$, spatio-temporal feature fusion module $M_{st}$, and discriminator $D_{ds}$ guided by a DS theory. Then, video data in the DFEW is preprocessed, the last N frames are extracted to obtain consecutive video frames, and face detection, alignment, and clipping operations are performed on the video frames to obtain facial expression image P .

In the DSER network model, the facial expression image P is input into the same-identity inter-frame sharing module $M_s$ and the space-domain attention module $M_{att}$ in the DSER network model to obtain same-identity inter-frame shared feature $F_s^P$ and space-domain attention feature $F_{att}^P$ respectively, and the same-identity inter-frame shared feature $F_s^P$ is multiplied by the space-domain attention feature $F_{att}^P$ to obtain space-domain feature $F_{satt}^{PS}$. The facial expression image P is sequentially input into the time-domain FC unit $V_{FC}$ and the time-domain multi-layer perceptron unit $V_{MLP}$ in the DSER network model to obtain time-domain vector $V_{FCMLP}^{PT}$. The space-domain feature $F_{satt}^{PS}$ and the time-domain vector $V_{FCMLP}^{PT}$ are input into the spatio-temporal feature fusion module $M_{st}$ of the DSER network model to obtain spatio-temporal feature $F_{st}^P$. The spatio-temporal feature $F_{st}^P$ is input into the discriminator $D_{ds}$ guided by the DS theory in the DSER network model, to obtain classification result R, and facial expression classification is performed.

Effectiveness of the method in the present disclosure is proved by comparing the DSER network model with traditional neural network models (C3D, P3D, I3D-RGB, Resnet18+LSTM) and current mainstream neural network models (CAER Net, FAN, Former DFER) under unified experimental conditions. Comparison results are shown in Table 1. In Table 1, Params represents a parameter quantity, which is used to measure a size of the model; GFLOPs represents a quantity of floating-point operations, which is used to measure an operation speed of the model; ACC represents accuracy, which is used to measure prediction accuracy of the model; Precision represents precision, which is used to measure a ratio of correctly predicted positive categories to all samples that are predicted as positive; Recall represents a recall rate, which is used to measure a ratio of the correctly predicted positive categories to all actual positive samples; F1-score represents a weighted harmonic mean of the Precision and the Recall, which is used to measure a capability of the model for finding a positive example; weighted represents calculating an index of each label and finding a mean weighted by support (a quantity of true instances per label); and macro represents calculating an unweighted mean of each category, without considering label imbalance.

The DFEW is used for training, and evaluation in the dataset is performed. Results are shown in Table 1. For the sake of fairness, the unified experimental conditions are adopted for all models that need to be compared. Finally, the method in the present disclosure outperforms latest mainstream models in terms of four evaluation indicators. It is worth noting that under the evaluation indicators precision, recall, and F-1 score, the model in the present disclosure is less than 1% ahead of existing most advanced models in a weighted state, but is about 3% ahead of the existing most advanced models in a macro (unweighted mean) state. It is believed that the indicators in the macro state are generally more affected by sample imbalance, but the model in the present disclosure is least affected by the sample imbalance and has a greater lead than a lead in the weighted state. This indicates that RS-DFER proposed in the present disclosure can effectively alleviate harm caused by the sample imbalance. In addition, the Params and the FLOPs show that the model in the present disclosure achieves a good prediction, with fewer 104.26 M Params and fewer 0.35 G FLOPs than the DSER, indicating that the model in the present disclosure is the most cost-effective.

use three classifiers, achieving a balance between efficiency and performance. The model in the present disclosure has same performance as the Former-DFER in most categories (happiness, sadness, neutral, and anger), and outperforms the Former-DFER in a few categories (surprise, disgust, and fear). For example, the model in the present disclosure significantly improves the recall rate for the category "disgust", reaching 12.16%, almost six times that of the Former-DFER. Compared with the most advanced methods available, this improvement emphasizes effectiveness of the model in the present disclosure in better learning and identifying expressions of a minority of classes.

Figure 4:
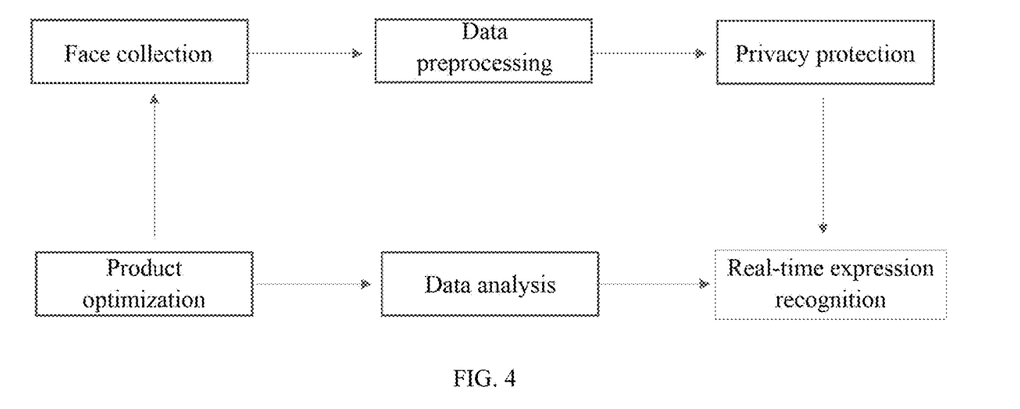
FIG. 4 is a flowchart of the present disclosure in an example scenario.

Example scenario: Supermarket customer satisfaction survey, as shown in FIG. 4.

Face collection: A device with a high-definition camera is installed at a plurality of key locations in a supermarket, such as an entrance, a checkout area, and a main shelf area. The camera can capture and record a facial expression of a customer.

Data preprocessing: Video data captured by the camera needs to be preprocessed. Dlib or another face detection tool is used to extract a facial image of the customer from a video frame and adjust the facial image to appropriate resolution for algorithm processing.

Privacy protection: To ensure privacy of the customer, all captured facial data should be anonymized, for example, by blurring or removing a specific personal feature.

Real-time expression recognition: Preprocessed facial data is input into an expression recognition algorithm provided in the present disclosure. The expression recognition algorithm can recognize seven basic emotional states in real time: happiness, sadness, anger, fear, surprise, disgust, and neutrality.

Data analysis: At the end of each day, collected expression data is integrated and analyzed. For example, it is allowed to evaluate an emotion distribution of the customer in the checkout area within a specific time period, or observe a response of the customer in a shelf area after a new product is launched.

Result application:

Product layout optimization: If lots of confused or dissatisfied expressions are captured in a specific shelf area, a supermarket manager may consider rearranging a product or providing a clearer identifier.

TABLE 1

Comparison results of the models

| Method | Params(M) | GFLOPS | ACC | precision | | recall | | F-1 score | |
|---|---|---|---|---|---|---|---|---|---|
| | | | | weighted | macro | weighted | macro | weighted | macro |
| C3D | 78.79 | 4.87 | 50.39 | 51.26 | 40.74 | 50.93 | 39.29 | 50.27 | 39.54 |
| P3D | 74.43 | 4.83 | 51.37 | 52.44 | 40.88 | 51.83 | 40.72 | 51.32 | 40.18 |
| I3D-RGB | 33.48 | 4.53 | 51.84 | 52.58 | 41.83 | 51.78 | 40.39 | 51.65 | 40.41 |
| Resnet18 + LSTM | 31.53 | 4.55 | 50.67 | 51.45 | 40.23 | 50.75 | 39.90 | 50.54 | 39.48 |
| CAER-Net | 22.81 | 4.37 | 50.58 | 50.02 | 40.96 | 50.32 | 39.74 | 50.29 | 39.82 |
| FAN | 34.18 | 4.58 | 56.48 | 58.22 | 47.23 | 56.48 | 47.95 | 56.36 | 47.21 |
| Former-DFER | 146.78 | 5.13 | 61.43 | 62.76 | 49.94 | 62.09 | 51.51 | 60.76 | 50.46 |
| Ours | 42.52 | 4.78 | 62.23 | 63.31 | 51.79 | 62.34 | 54.42 | 61.35 | 52.12 |

Figure 3:
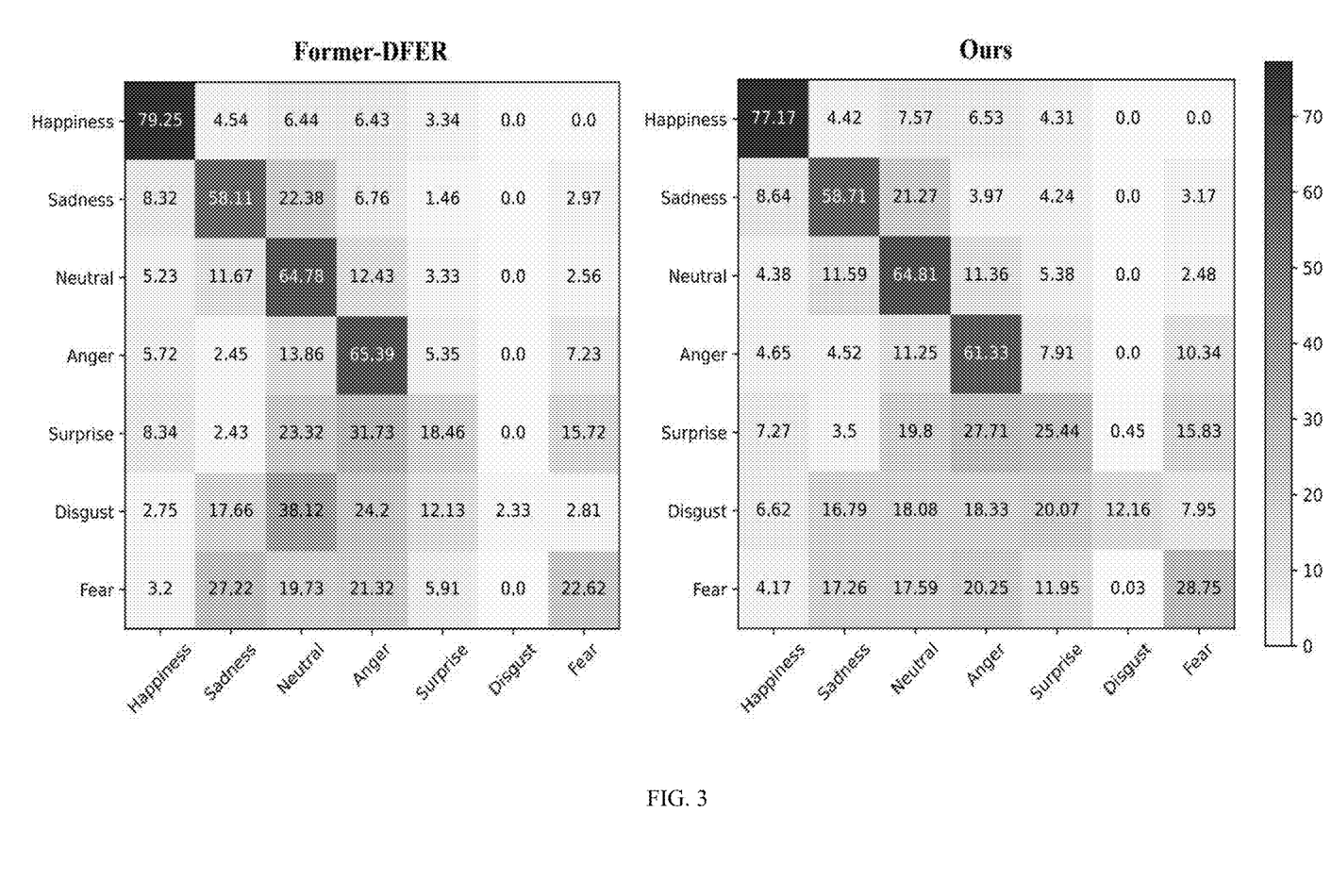
FIG. 3 shows a comparison of confusion matrices of the present disclosure and Former DFER.

In order to thoroughly evaluate the method proposed in the present disclosure and compare the method with existing advanced methods, an ACC of each category in a dataset AFEW is analyzed and visually applied to a confusion matrix, as shown in FIG. 3. This is intended to achieve maximum performance with a minimum computational cost. Through an experiment, it is determined that it is optimal to Service improvement: If customers in the checkout area generally show dissatisfaction or anxiety, the manager can take a measure to improve checkout efficiency or increase checkout staff during peak hours.

Marketing strategy adjustment: An emotional response of the customer to a specific promotion activity is analyzed, so as to adjust or optimize a promotion strategy.

Feedback loop: Based on the collected data and an analysis result, the supermarket can make regular strategy adjustment. In addition, the expression recognition algorithm can be regularly updated and optimized to capture and interpret an emotion of the customer more accurately.

The practical application scenario of the expression recognition can help the supermarket better understand a real feeling and need of the customer, thereby providing better shopping experience.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

What is claimed is:

1. A dynamic facial expression recognition (FER) method based on a Dempster-Shafer (DS) theory, comprising the following steps:
   a) preprocessing video data V in a dataset, extracting last N frames of the video data V to obtain consecutive video frames, and performing face detection, alignment, and clipping operations on the video frames to obtain a facial expression image P;
   b) constructing a Dempster-Shafer theory Expression Recognition (DSER) network model, wherein the DSER network model comprises a same-identity inter-frame sharing module $M_s$ a space-domain attention module $M_{att}$ a time-domain fully connected (FC) unit $V_{FC}$, a time-domain multi-layer perceptron unit $V_{MLP}$, a spatio-temporal feature fusion module $M_{st}$, and a discriminator $D_{ds}$ guided by a DS theory;
   c) separately inputting the facial expression image P into the same-identity inter-frame sharing module $M_s$ and the space-domain attention module $M_{att}$ in the DSER network model, to obtain a same-identity inter-frame shared feature $F_s^P$ and a space-domain attention feature $F_{att}^P$, and multiplying the same-identity inter-frame shared feature $F_s^P$ by the space-domain attention feature $F_{att}^P$ to obtain a space-domain feature $F_{satt}^{PS}$;
   d) sequentially inputting the facial expression image P into the time-domain FC unit $V_{FC}$ and the time-domain multi-layer perceptron unit $V_{MLP}$ in the DSER network model to obtain a time-domain vector $V_{FCMLP}^{PT}$;
   e) inputting the space-domain feature $F_{satt}^{PS}$ and the time-domain vector $V_{FCMLP}^{PT}$ into the spatio-temporal feature fusion module $M_{st}$ in the DSER network model to obtain a spatio-temporal feature $F_{st}^P$;
   f) inputting the spatio-temporal feature $F_{st}^P$ into the discriminator $D_{ds}$ guided by the DS theory in the DSER network model, to obtain a classification result R, and completing the construction of the DSER network model;
   g) calculating a loss function l;
   h) iterating the DSER network model by using the loss function l and an Adam optimizer, to obtain a trained DSER network model; and
   i) processing to-be-detected video data by using the step a), to obtain a facial expression image, and inputting the facial expression image into the trained DSER network model to obtain the classification result R.

2. The dynamic FER method based on the DS theory according to claim 1, wherein in the step a), last 16 frames of the video data V are extracted based on a VideoCapture class in Python to obtain consecutive video frames, face detection is performed on the consecutive video frames by using a Deformable Parts Model (DPM) algorithm, a face image of each of the consecutive video frames is extracted to obtain a continuous 16-frame face image, and face alignment and clipping are performed on the continuous 16-frame face image by using a practical expression landmark detector (PELD) algorithm, to obtain an aligned continuous 16-frame facial expression image P.

3. The dynamic FER method based on the DS theory according to claim 1, wherein the step c) comprises the following steps:
   c-1) constituting the same-identity inter-frame sharing module $M_s$ by a first convolution module, a second convolution module, and a third convolution module sequentially, and constituting the space-domain attention module $M_{att}$ by a first FC module and a second FC module sequentially;
   c-2) constituting the first convolution module of the same-identity inter-frame sharing module $M_s$ by a convolutional layer with a 3*3 convolution kernel and a stride of 1, a batch normalization (BN) layer, and a rectified linear unit (ReLU) activation function layer sequentially, and inputting the facial expression image P into the first convolution module to obtain a feature $F_{s1}^P$;
   c-3) constituting the second convolution module of the same-identity inter-frame sharing module $M_s$ by a downsampling module and a residual module sequentially, wherein the downsampling module comprises a first branch and a second branch, the first branch sequentially comprises a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer, the second branch sequentially comprises a third convolutional layer with a 1*1 convolution kernel and a stride of 2, a third BN layer, and a third ReLu activation function layer, the residual module sequentially comprises a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer; inputting the feature $F_{s1}^P$ into the first branch of the downsampling module of the second convolution module to obtain a feature $F_{sd2}^{P1}$, and inputting the feature $F_{sd2}^P$ into the second branch of the downsampling module of the second convolution module to obtain a feature $F_{sd2}^{P2}$; adding up the feature $F_{sd2}^{P1}$ and the feature $F_{sd2}^{P2}$ to obtain a feature $F_{sd2}^P$; and inputting the feature $F_{sd2}^P$ into the residual module of the second convolution module to obtain a feature $F_{s2}^P$;
   c-4) constituting the third convolution module of the same-identity inter-frame sharing module $M_s$ by a downsampling module and a residual module sequentially, wherein the downsampling module comprises a first branch and a second branch, the first branch sequentially comprises a first convolutional layer with a 3*3 convolution kernel and a stride of 2, a first BN layer, a first ReLu activation function layer, a second convolutional layer with a 3*3 convolution kernel and a stride of 1, a second BN layer, and a second ReLu activation function layer, the second branch sequentially comprises a third convolutional layer with a 1*1 convolution kernel and a stride of 2, a third BN layer, and a third ReLu activation function layer, the residual module sequentially comprises a fourth convolutional layer with a 3*3 convolution kernel and a stride of 1, a fourth BN layer, a fourth ReLu activation function layer, a fifth convolutional layer with a 3*3 convolution kernel and a stride of 1, a fifth BN layer, and a fifth ReLu activation function layer; inputting the feature $F_{s2}^P$ into the first branch of the downsampling module of the third convolution module to obtain a feature $F_{sd3}^{P1}$, and inputting the feature $F_{s1}^P$ into the second branch of the downsampling module of the third convolution module to obtain a feature $F_{sd3}^{P2}$; adding up the feature $F_{sd3}^{P1}$ and the feature $F_{sd3}^{P2}$ to obtain a feature $F_{sd3}^P$; and inputting the feature $F_{sd3}^P$ into the residual module of the third convolution module to obtain a feature $F_{s3}^P$;

c-5) calculating the same-identity inter-frame shared feature $F_s^P$ according to a formula $$F_s^P = \frac{1}{16}\sum_{i=1}^{16} F_{s3}^{Pi},$$

wherein in the formula, $F_{s3}^{Pi}$ represents an $i^{th}$ video frame vector in the feature $F_{sd3}^P$;

c-6) constituting the first FC module of the space-domain attention module $M_{att}$ by a BN layer, a flatten function, an FC layer, and a ReLu activation function layer sequentially, and inputting the facial expression image P into the first FC module to obtain a feature $F_{att1}^P$;

c-7) constituting the second FC module of the space-domain attention module $M_{att}$ by an FC layer and a Sigmoid function layer sequentially, and inputting the feature $F_{att1}^P$ into the second FC module to obtain the space-domain attention feature $F_{att}^P$; and c-8) multiplying the same-identity inter-frame shared feature $F_s^P$ by the space-domain attention feature $F_{att}^P$ to obtain the space-domain feature $F_{satt}^{PS}$.

4. The dynamic FER method based on the DS theory according to claim 1, wherein the step d) comprises the following steps:

d-1) constituting the time-domain FC unit $V_{FC}$ by a patch partitioning module, a flatten function, an FC layer, and a ReLU activation function layer sequentially, inputting the facial expression image P into the patch partitioning module for patch partitioning to obtain a patch partitioning vector $V_{patch}^P$, inputting the patch partitioning vector $V_{patch}^P$ into the flatten function to obtain a one-dimensional vector $V_{patch1}^P$, and sequentially inputting the one-dimensional vector $V_{patch1}^P$ into the FC layer and the ReLU activation function layer to obtain a time-domain FC vector $V_{FC}^P$; and d-2) constituting the time-domain multi-layer perceptron unit $V_{MLP}$ by a BN layer, an FC layer, and a ReLU activation function layer, and inputting the time-domain FC vector $V_{FC}^P$ into the time-domain multi-layer perceptron unit $V_{MLP}$ to obtain the time-domain vector $V_{FCMLP}^{PT}$.

5. The dynamic FER method based on the DS theory according to claim 1, wherein the step e) comprises the following step:

e-1) inputting the space-domain feature $F_{satt}^{PS}$ and the time-domain vector $V_{FCMLP}^{PT}$ into the spatio-temporal feature fusion module $M_{st}$ in the DSER network model, and calculating the spatio-temporal feature $F_{st}^P$ according to a formula $F_{st}^P = F_{satt}^{PS} + \lambda V_{FCMLP}^{PT}$, wherein $\lambda$ represents an adjustable hyper-parameter.

6. The dynamic FER method based on the DS theory according to claim 5, wherein $\lambda = 0.54$.

7. The dynamic FER method based on the DS theory according to claim 1, wherein the step f) comprises the following steps:

f-1) constituting, by a multi-branch convolution module, an uncertainty combination module, a multi-branch fusion module, and a determining module sequentially, the discriminator $D_{ds}$ guided by the DS theory;

f-2) constituting the multi-branch convolution module by a first branch, a second branch, and a third branch sequentially, wherein the first branch, the second branch, and the third branch each sequentially comprise a first convolutional layer with a 3*3 convolution kernel and a stride of 1, a first BN layer, a first ReLu activation function layer, a second convolutional layer with a 3*3 convolution kernel and a stride of 2, a second BN layer, a second ReLu activation function layer, an average pooling layer, a flatten function layer, and a linear layer sequentially; and inputting the spatio-temporal feature $F_{st}^P$ into the first branch, the second branch, and the third branch of the multi-branch convolution module to obtain a first branch vector $V_{st1}^P$, a second branch vector $V_{st2}^P$, a third branch vector and $V_{st3}^P$ respectively;

f-3) inputting the first branch vector $V_{st1}^P$, the second branch vector $V_{st2}^P$ and the third branch vector $V_{st3}^P$ into the uncertainty combination module; taking an exponent with e as a base for the first branch vector $V_{st1}^P$ to obtain a first evidence vector $e_1 = [e_1^1, e_1^2, \ldots, e_1^k, \ldots, e_1^K]1$, wherein $e_1^k$ represents an $i^{th}$ evidence vector in the first branch vector, and k=[1, 2, ..., K]; taking the exponent with e as the base for the second branch vector $V_{st2}^P$ to obtain a second evidence vector $e_2 = [e_2^1, e_2^2, \ldots, e_2^k, \ldots, e_2^K]$, wherein $e_2^k$ represents an $i^{th}$ evidence vector in the second branch vector; taking the exponent with e as the base for the third branch vector $V_{st3}^P$ to obtain a third evidence vector $e_3 = [e_3^1, e_3^2, \ldots, e_3^k, \ldots, e_3^K]$, wherein $e_3^k$ represents an $i^{th}$ evidence vector in the third branch vector, k=[1 2, ..., k], K represents a quantity of sample categories, K=7, and values of k one-to-one correspond to numbers in a label sequence [1: surprise, 2: fear, 3: disgust, 4: happiness, 5: sadness, 6: anger, 7: neutral]; calculating a $k^{th}$ Dirichlet parameter $\alpha_1^k$ of the first evidence vector $e_1$ according to a formula $\alpha_1^k = e_1^k + 1$, calculating a $k^{th}$ Dirichlet parameter $\alpha_2^k$ of the second evidence vector $e_2$ according to a formula $\alpha_2^k = e_2^k + 1$, and calculating a $k^{th}$ Dirichlet parameter $\alpha_3^k$ of the third evidence vector $e_3$ according to a formula $\alpha_3^k = e_3^k + 1$; obtaining Dirichlet strength $S_1$ of the first evidence vector $e_1$ according to a formula $S_1 = \sum_{k=1}^{K} \alpha_1^k$, Dirichlet strength $S_2$ of the second evidence vector $e_2$ according to a formula $S_2 = \sum_{k=1}^{K} \alpha_2^k$, and Dirichlet strength $S_3$ of the third evidence vector $e_3$ according to a formula $S_3 = \sum_{k=1}^{K} \alpha_3^k$; obtaining first uncertainty $u_1$ according to a formula $$u_1 = \frac{K}{S_1},$$

second uncertainty $u_2$ according to a formula $$u_2 = \frac{K}{S_2},$$

and third uncertainty $u_3$ according to a formula $$u_3 = \frac{K}{S_3};$$

obtaining a first confidence coefficient $b_1$ according to a formula $$b_1 = \frac{\alpha_1^k - 1}{S_1},$$

a second confidence coefficient $b_2$ according to a formula $$b_2 = \frac{\alpha_2^k - 1}{S_2},$$

and a third confidence coefficient $b_3$ according to a formula $$b_3 = \frac{\alpha_3^k - 1}{S_3};$$

calculating a first conflict factor $C_{12}$ according to a formula $C_{12}=b_1 b_2$ and a second conflict factor $C_{23}$ according to a formula $C_{23}=b_2 b_3$; calculating a second prefix weight $w_2$ according to a formula $$w_2 = \frac{1}{1 - C_{12}} u_1 u_2,$$

and a third prefix weight $w_3$ according to a formula $$w_3 = \frac{1}{1 - C_{23}} u_2 u_3,$$

wherein a first prefix weight is $w_1=1$; and multiplying the first branch vector $V_{st1}^P$ by the first prefix weight $w_1$ to obtain a first weight vector $V_1^P$, multiplying the second branch vector $V_{st2}^P$ by the second prefix weight $w_2$ to obtain a second weight vector $V_2^P$, and multiplying the third branch vector $V_{st3}^P$ by the third prefix weight $w_3$ to obtain a third weight vector $V_3^P$;

f-4) inputting the first weight vector $V_1^P$ the second weight vector $V_2^P$ and the third weight vector $V_3^P$ into the multi-branch fusion module, and calculating a fusion vector $V_{fuse}^P$ according to a formula $V_{fuse}^P = V_1^P + V_2^P + V_3^P$; and f-5) constituting the determining module by a Softmax function and a max function, inputting the fusion vector $V_{fuse}^P$ into the Softmax function for normalization, inputting a normalized fusion vector $V_{fuse}^P$ into the max function to obtain a subscript $E_k$ of a maximum value, wherein k=[1, 2, . . . , K], and the values of k one-to-one correspond to the numbers in the label sequence [1: surprise, 2: fear, 3: disgust, 4: happiness, 5: sadness, 6: anger, 7: neutral], and comparing the subscript $E_k$ of the maximum value with the label sequence [1: surprise, 2: fear, 3: disgust, 4: happiness, 5: sadness, 6: anger, 7: neutral] to find a corresponding expression label as a determining result R.

8. The dynamic FER method based on the DS theory according to claim 5, wherein in the step g), the loss function l is calculated according to a formula $l=\lambda l_{KL}(E_k)+l_{BCE}(V_{fuse}^P)$, wherein $\lambda$ represents an adjustment factor, $\lambda=0.04$, $l_{KL}(E_k)$ represents a calculation result of a KL loss of a subscript $E_k$, and $l_{BCE}(V_{fuse}^P)$ represents a calculation result of a BCE loss of a fusion vector $V_{fuse}^P$.

* * * * *